Nov. 21, 1950  E. S. SCOTT  2,531,303
WEIGHING APPARATUS
Filed Nov. 17, 1947  7 Sheets-Sheet 1

Inventor
Elmer S. Scott
By Clarence A. O'Brien
and Harvey B. Jacobson
Attorneys

Elmer S. Scott
Inventor

Nov. 21, 1950 E. S. SCOTT 2,531,303
WEIGHING APPARATUS
Filed Nov. 17, 1947 7 Sheets-Sheet 4

Elmer S Scott
Inventor

By Clarence A O'Brien
and Harvey B. Jacobson
Attorney

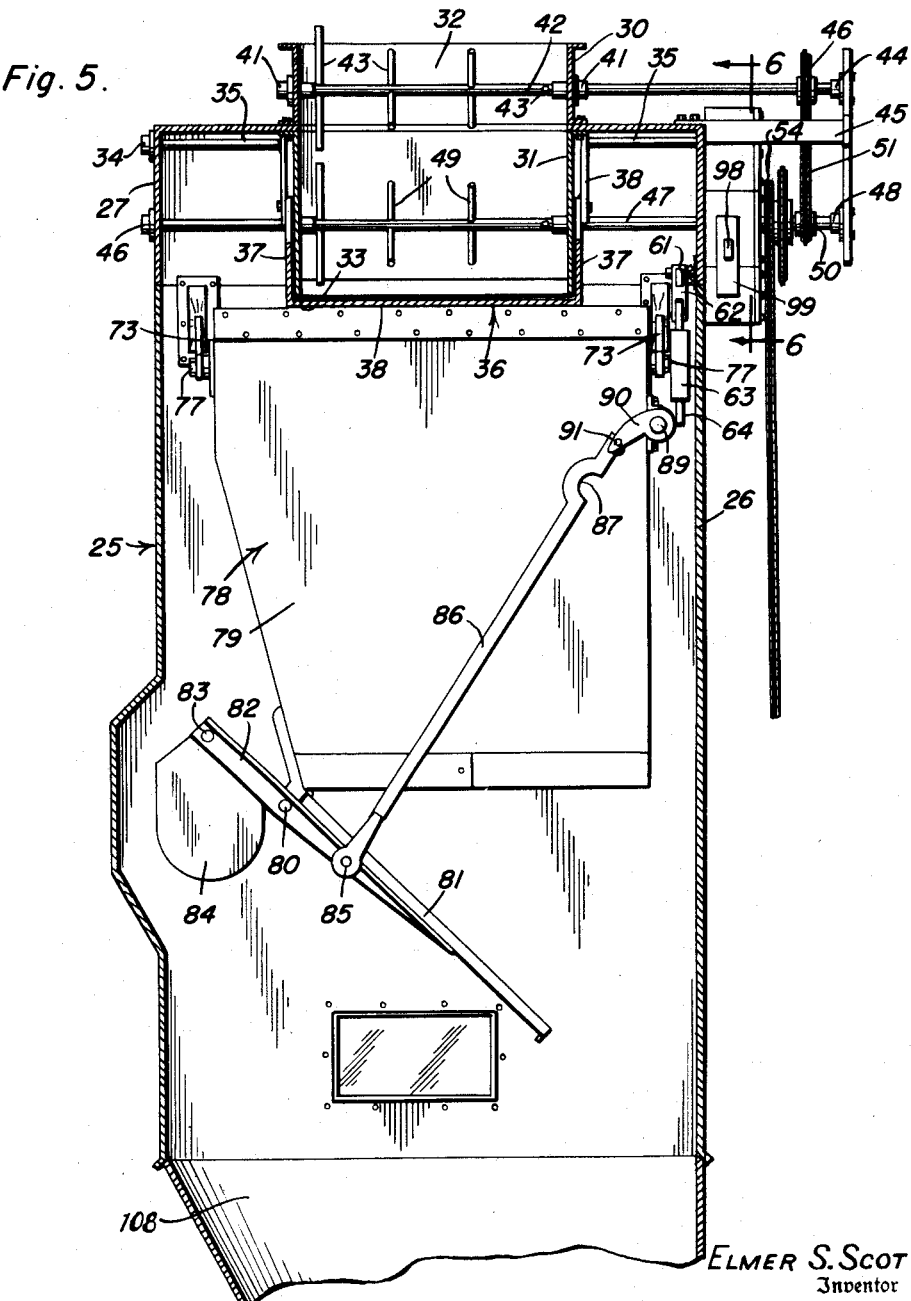

Nov. 21, 1950     E. S. SCOTT     2,531,303
WEIGHING APPARATUS
Filed Nov. 17, 1947     7 Sheets-Sheet 6

Elmer S. Scott
Inventor

By Clarence A. O'Brien
and Harvey B. Jacobson
Attorney

Nov. 21, 1950     E. S. SCOTT     2,531,303
WEIGHING APPARATUS

Filed Nov. 17, 1947     7 Sheets-Sheet 7

Elmer S. Scott
INVENTOR.

BY *Clarence A. O'Brien and Harvey B. Jacobson*
Attorneys

Patented Nov. 21, 1950

2,531,303

UNITED STATES PATENT OFFICE 2,531,303

WEIGHING APPARATUS

Elmer S. Scott, Dallas, Tex.

Application November 17, 1947, Serial No. 786,360

7 Claims. (Cl. 249—53)

This invention relates to weighing apparatus and more particularly to apparatus for weighing granular material and the like.

The primary object of the invention is automatically to separate a flowing stream of granular material into separate charges of predetermined weight.

Another object is to enable the weight of the charges to be varied in accordance with the desires of the user.

A still further object is to segregate from a flowing stream of granular material a mass or charge of such material having a predetermined weight and depositing the material so segregated into a suitable receptacle therefor.

The above and other objects may be attained by employing this invention which embodies among its features a vertically moving bucket in which the material to be weighed is deposited, said bucket having a normally closed bottom discharge opening, actuating means for opening the bottom discharge opening to permit the discharge of the contents of the bucket and a rock arm movable in unison with the bucket and holding the weight actuated means inoperative until the rock arm reaches a predetermined position at the lower end of its travel.

Other features include means actuated by the rock arm to interrupt the flow of granular material into the bucket when the weight actuating means opens the bottom discharge opening of the bucket.

A further feature of the invention embodies weight controlled trip mechanism actuated by the rock arm for arresting downward movement of the rock arm with the bucket until the weight of the contents of the bucket attains a predetermined value.

In the drawings—

Figure 5 is a fragmentary sectional view taken substantially on the line 5—5 of Figure 4;

Figure 12 is a vertical sectional view taken on the line 12—12 of Figure 6;

Figure 14 is a perspective view of certain parts of the weighing mechanism.

Figure 4:
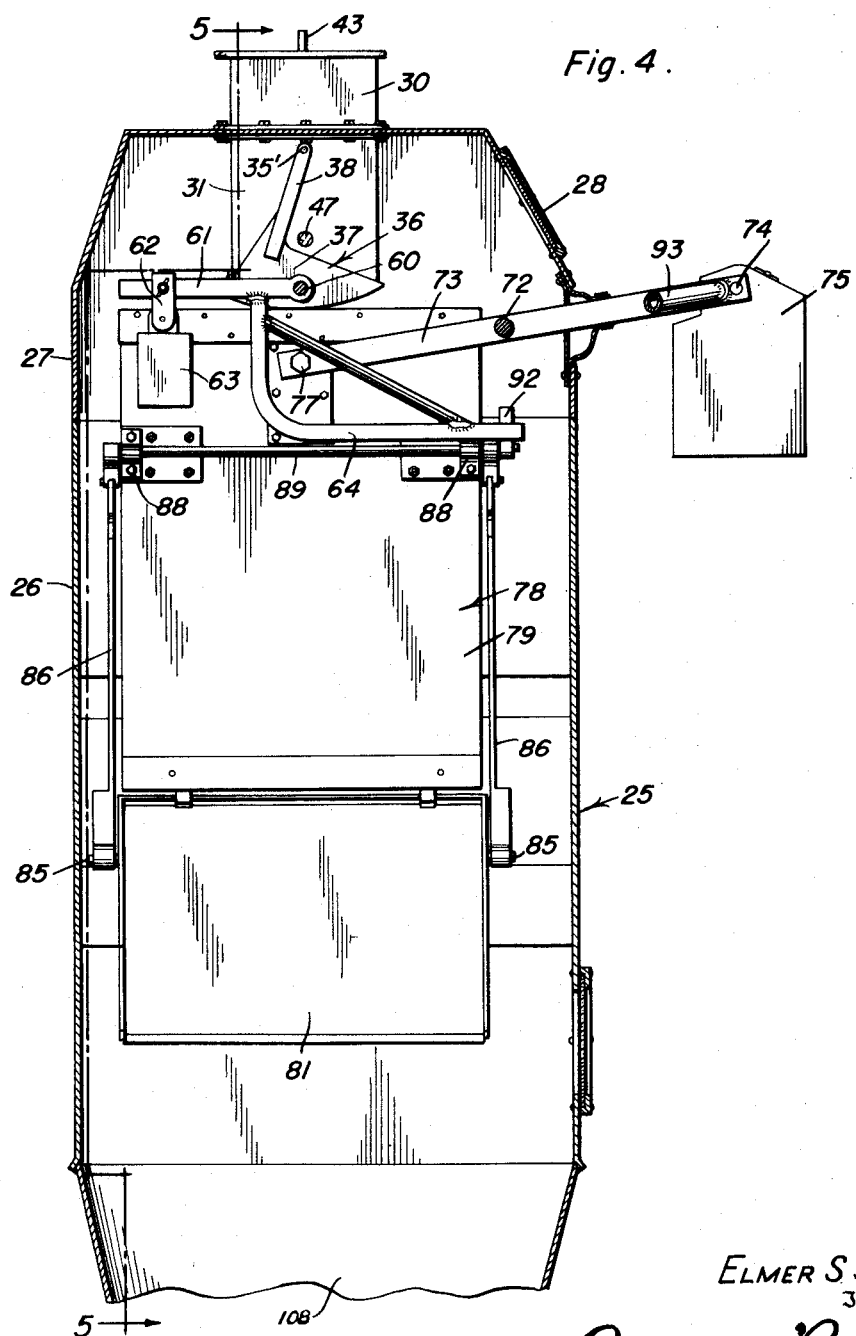
Figure 4 is a view similar to Figure 3 showing the bucket lowered and the bottom door open.
Figure 13:
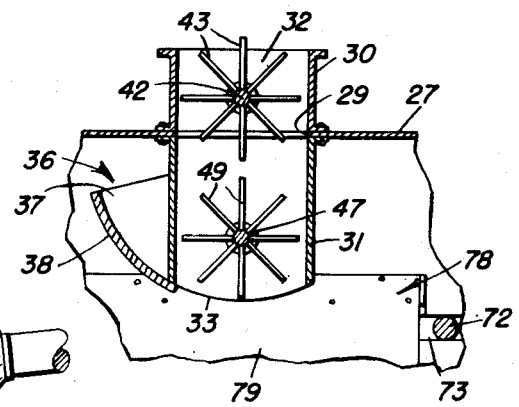
Figure 13 is a fragmentary sectional view taken substantially on the line 13—13 of Figure 2.
Figure 9:
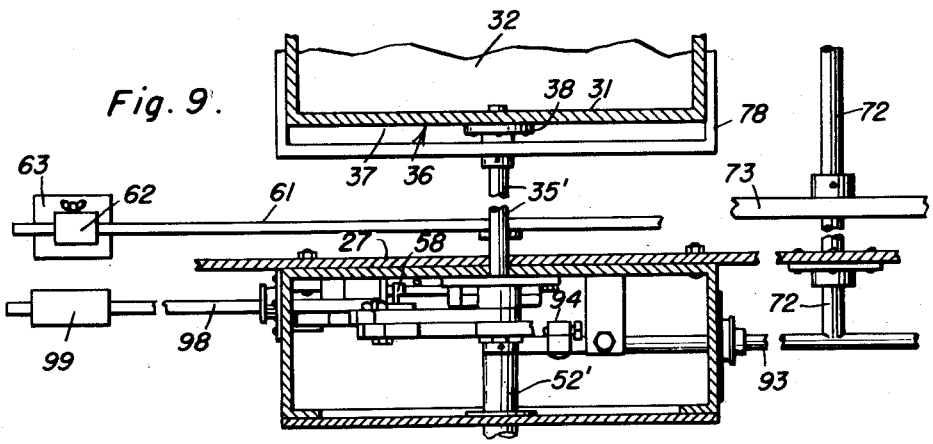
Figure 9 is a fragmentary sectional view taken substantially on the line 10—10 of Figure 6.

Referring to the drawings in detail an outer casing designated generally 25 comprises an elongated substantially rectangular tubular body 26 provided at its upper end with a cap member 27 having a window 28 therein. Opening through the top of the cap member 27 is a feed opening 29, adjacent the edges of which is bolted or otherwise fixed to the cap 27 an upwardly extending tubular section 30, and depending from the underside of the top of the cap 27 is a similar tubular member 31 which cooperates with the tubular member 30 in forming a chute 32 through which the granular material to be weighed is introduced into the device. The lower ends of the end walls of the chute 32 are curved concentrically as at 33 (Figure 13) about a horizontal axis which lies near the upper end of the cap 27 for a purpose to be more fully hereinafter explained. Carried by opposite side walls of the cap 27 in alignment with the axis above referred to are journal bearings 34 (Figure 5) in which are rockably supported trunnions 35 and 35' of a gate designated generally 36. This gate comprises substantially segmental end walls 37 (Figure 4) to which the trunnions 35 and 35' are connected as by arms 38, and the lower ends of these segmental end walls are curved concentrically about the axis of the trunnions 35 and 35'. These curved edges carry a bottom 38 (Figure 5) which is also curved concentrically about the axis of the trunnions 35 and 35', and follows closely the curvatures 33 of the end walls of the chute 32. It will thus be seen that the gate 36 is rockably supported in a position to close the lower end of the chute 32, it being understood that the curved bottom 38 thereof is of sufficient width that when the gate is in its lowermost position, the lower end of the chute 32 will be completely blocked. The ends of the trunnions 35 and 35' project through their respective bearings 34 beyond the adjacent wall of the casing 26, and fixed to the projecting end of the trunnion 35' is a control arm 39 which is provided adjacent its end remote from the trunnion 35' with a longitudinal slot 40 the purpose of which will be more fully hereinafter explained.

Mounted in suitable bearings 41 (Figure 5) in the end walls of the upper tubular member 30 of chute 32 is an agitator shaft 42 which is provided at spaced intervals with radially disposed agitators 43. These agitators 43 work within the upper section 30 of the chute 32 in order to break up any lumps which may form in the granular material and which might interfere with its flow through the chute 32. One end of the shaft 42 is projected across the top of the cap 27 and is journaled in a suitable bearing 44 carried by a frame 45 which is supported to one side of and adjacent the upper end of the cap 27. Fixed to the shaft 42 near the bearing 44 is a drive sprocket 46 by means of which the shaft 42 is driven. Mounted to rotate in aligned bearings 46' carried by opposite end walls of the cap 27 is a shaft 47 which like the shaft 42 has one end journaled in a bearing 48 carried by the frame 45. The bearings 46' and 48 are aligned and the axis of the shaft 47 lies in vertically spaced relation to and in a vertical plane which coincides with the axis of the shaft 42. The portion of the shaft 47 which extends through the lower tubular section 31 of the chute 32 is provided with radial agitators 49 which like the agitators 43 serve to break up any lumps in the granular material passing through the chute 32. A drive sprocket 50 is fixed to the shaft 47 directly below the sprocket 46, and this sprocket 50 has driving connection with the sprocket 46 through the medium of an endless chain 51. It will thus be seen that when the shaft 47 is set into operation, the shaft 42 will be driven in unison therewith.

Figure 10:
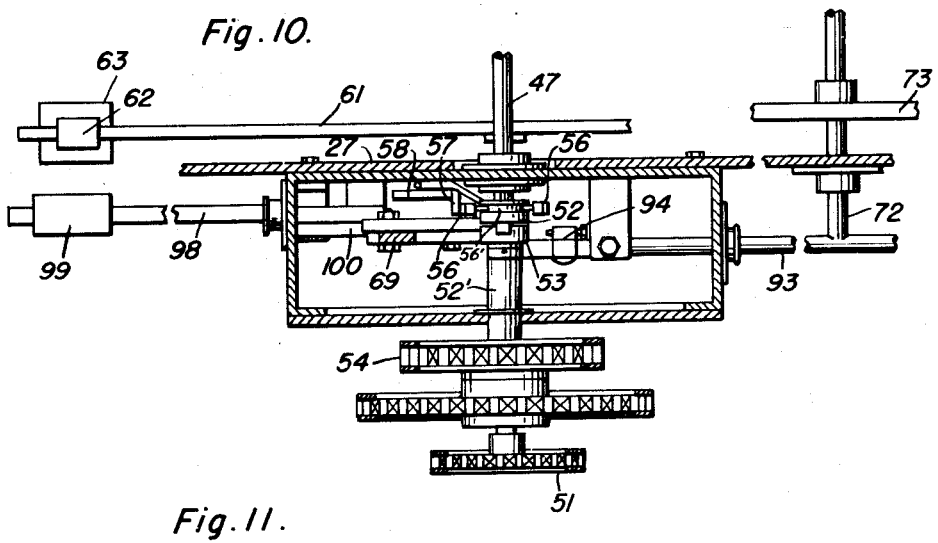
Figure 10 is a view similar to Figure 9 taken substantially on the line 10—10 of Figure 6.
Figure 11:
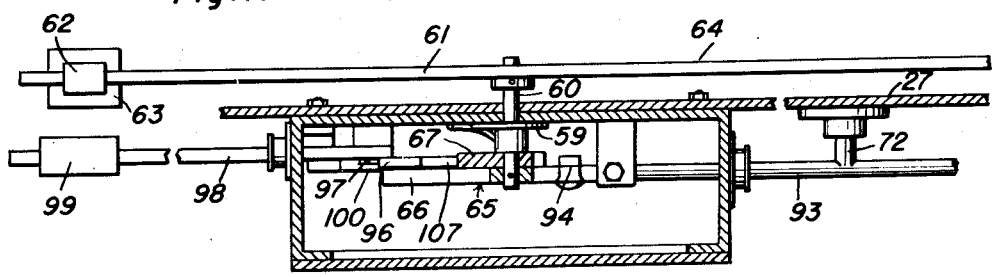
Figure 11 is a similar view taken on the line 11—11 of Figure 6.

Splined to the shaft 47 near the sprocket 50 is a clutch half 52 (Figure 10), and mounted to rotate about the shaft 47 adjacent the clutch half 52 is a sleeve 52' to which is fixed a clutch half 53. The sleeve 52' extends longitudinally of the shaft 47 and has mounted thereon a drive sprocket 54, so that when the clutch halves 52 and 53 are in engagement, the shaft 47 will be driven by the drive sprocket 54. A suitable fork 54' is mounted in a suitable bracket 55 to rock about a horizontal axis which lies below and in a plane perpendicular to the longitudinal axis of shaft 47, and carried by the tines of the fork 54' are screws 56 which are adapted to engage in an annular groove 56' in the clutch half 53 so that as the fork 54' is rocked about the axis of the bracket 55 the clutch half 52 will be moved into or out of engagement with the clutch half 53. A control arm 57 projects radially from the fork 54' and is provided with a laterally extending finger 58 by means of which the fork 54' may be rocked in the bracket 55. This finger 58 co-operates with the control mechanism in a manner to be more fully hereinafter described.

Figure 1:
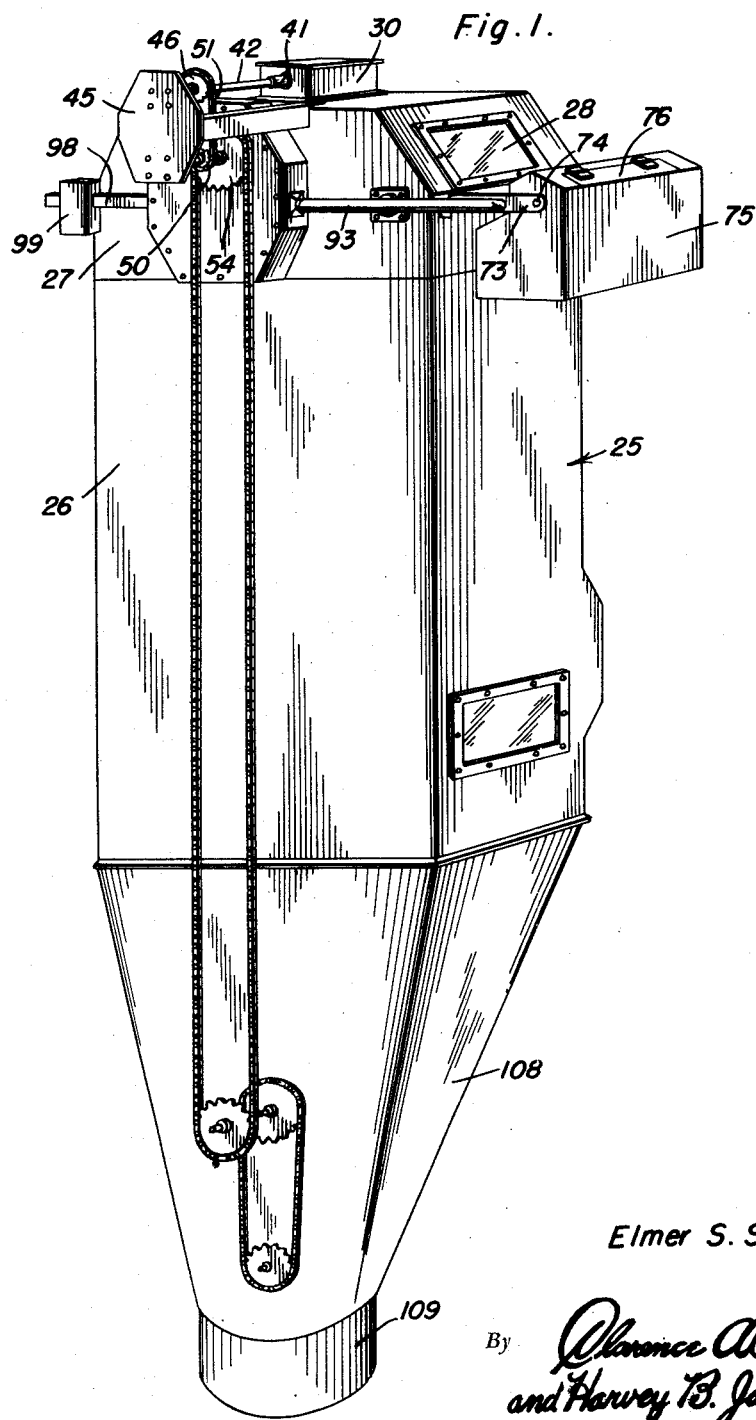
Figure 1 is a perspective view of a weighing device embodying the features of this invention.
Figure 2:
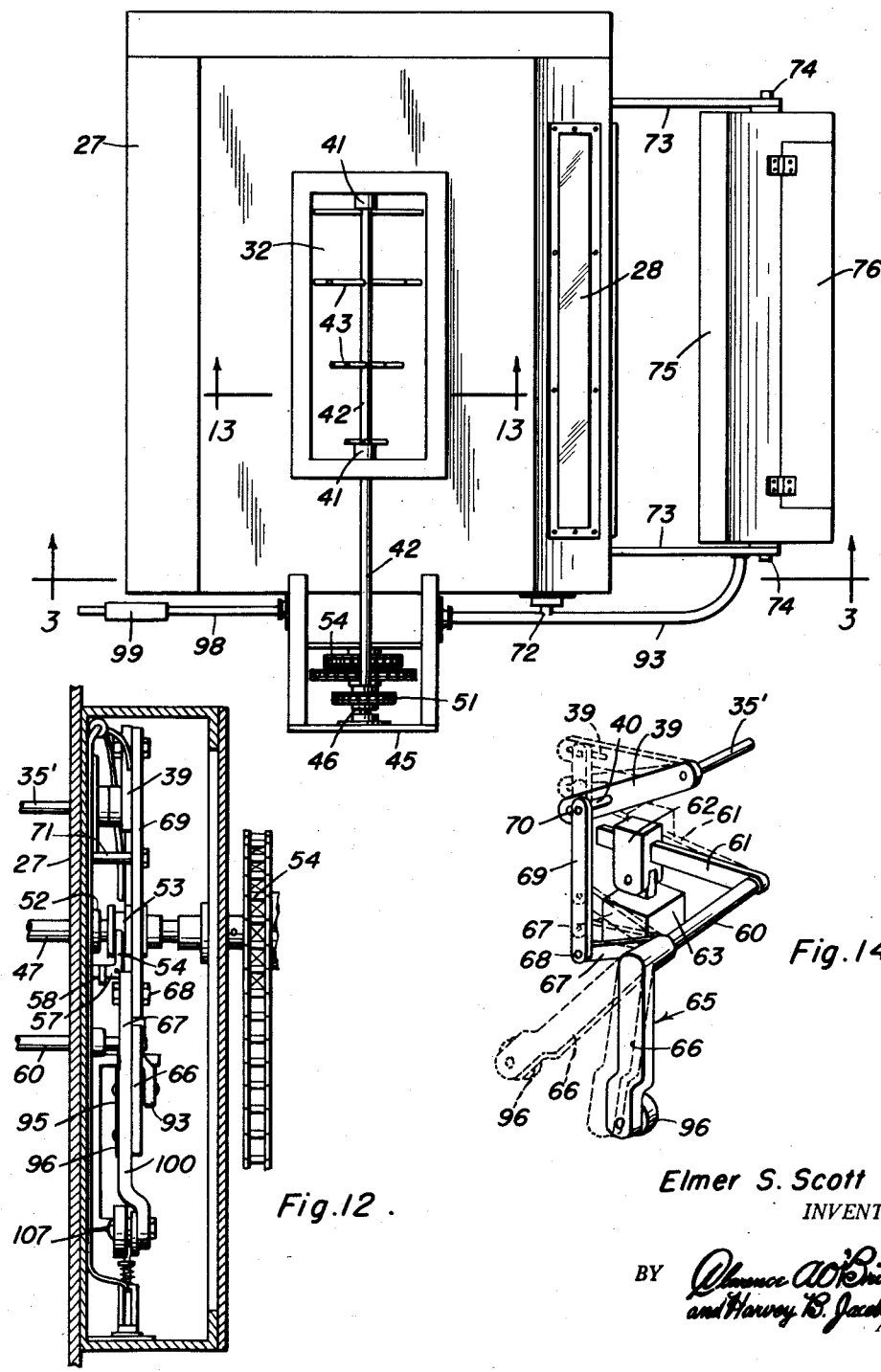
Figure 2 is a top plan view of the device illustrated in Figure 1.

Secured to the side of the cover 27 near the drive sprocket 54 and directly below the shaft 47 is a bearing bracket 59 in which a rock shaft 60 is journaled. This rock shaft projects through the side wall of the cap 27, and fixed thereto within the confines of the cap 27 is an actuating arm 61 (Figures 3 and 14) which projects radially from the shaft in a substantially horizontal position and has adjustably supported thereon by a yoke 62 an actuating weight 63 which tends to rock the shaft 60 in a counter-clockwise direction when viewed from the position illustrated in Figures 2, 3 and 14. Depending from the actuating arm 61 is a trip arm 64 by means of which the bucket discharging latches to be more fully hereinafter described are actuated to discharge the contents of the bucket.

Fixed to the end of the shaft 60 remote from the actuating arm 61 and on the exterior of the cap 27 is a bell crank lever designated generally 65 (Figures 6 and 14), the arms 66 and 67 of which radiate from the axis of the shaft 60 to form between them an acute angle. The arm 66 forms the check arm for the mechanism as will be more fully hereinafter explained, and pivotally connected at 68 to the end of the arm 67 remote from the shaft 60 is the lower end of a link 69, the upper end of which is pierced to receive a bolt 70 which is adjustably coupled to the arm 67 remote from the shaft 60 is the lower end of a link 69, the upper end of which is pierced to receive a bolt 70 which is adjustably coupled to the arm 39 through the slot 40. It will thus be seen that as the check arm 66 of the bell crank 65 moves in its arc about the axis of the rock shaft 60, the arm 39 will also move in unison therewith to rock the shaft 35' and govern the opening and closing of the gate 36. Adjustably carried intermediate the ends of the link 69 is a laterally extending stud 71 which is adapted to contact the finger 58 and move the lever 57 to cause the fork 54' to move the clutch half 52 into engagement with the clutch half 53 when the link 69 moves downwardly.

Figure 3:
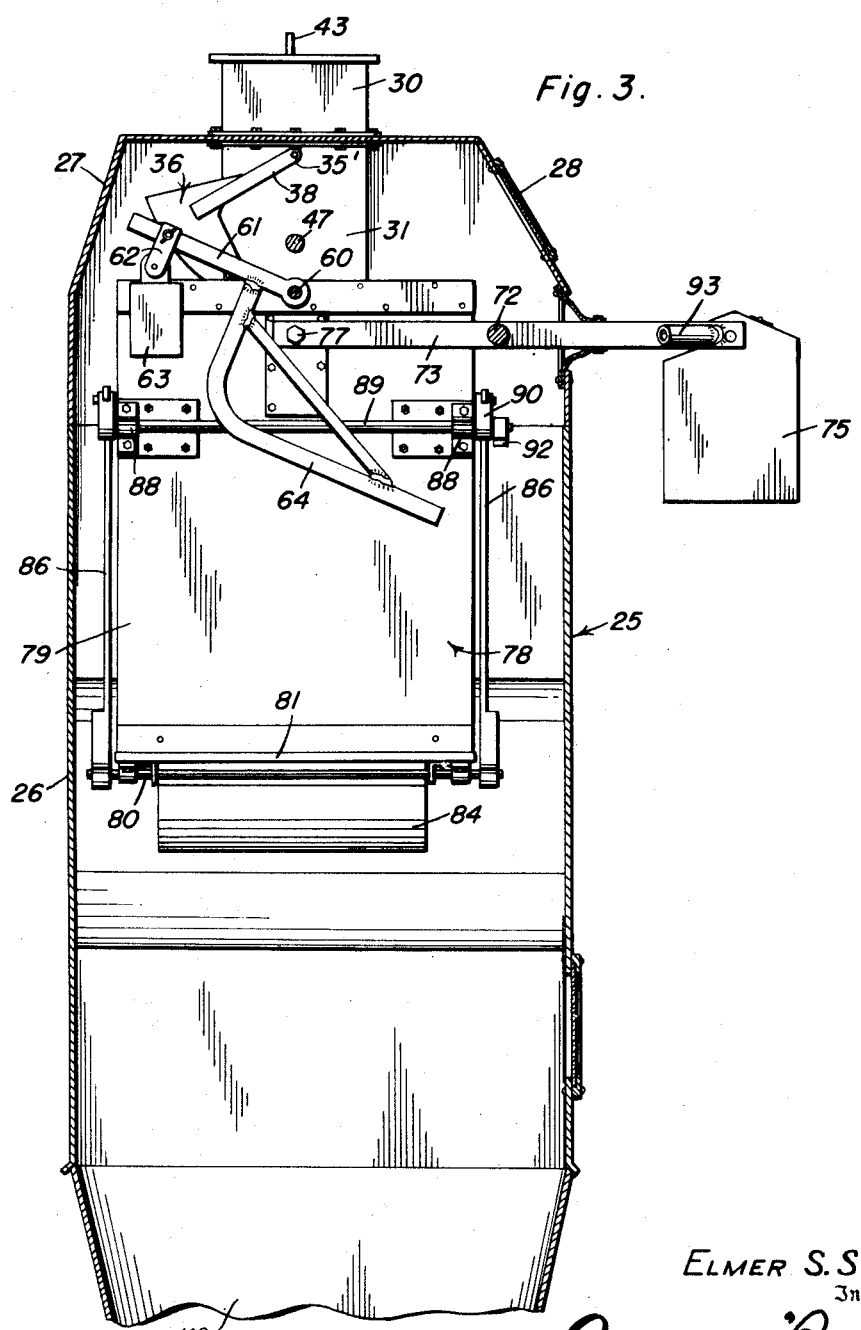
Figure 3 is a fragmentary sectional view taken substantially on the line 3—3 of Figure 2, showing the bucket in raised position with the bottom door closed.

Extending transversely through the cap 27 near the wall thereof containing the sight opening 28 is a rock shaft 72 carrying adjacent opposite ends lever arms 73. These lever arms project through the wall of the cap 27, and pivotally supported between the outer ends of the lever arms as at 74 is a counterweight 75 which takes the form of a hollow box provided with a hinged cover 76 through which sand or any other suitable weighting material may be introduced into the counterweight 75. Pivotally supported adjacent the inner ends of the arms 73 as at 77 is the upper end of a bucket designated generally 78, and the weighting material introduced into the counterweight 75 will be just sufficient to hold the bucket 78 in its uppermost position as illustrated in Figure 3.

The bucket 78 above referred to comprises a hollow rectangular body 79 having an open upper end which is disposed directly below the lower end of the chute 32. The lower end of the body 79 is wholly open and pivotally supported as at 80 adjacent one edge of the lower open end of the body 79 which lies perpendicular to the axis of the pivots 77 is a door 81. Fixed to the door and projecting oppositely thereto beyond the pivot 80 thereof is a pair of spaced parallel arms 82 between which is pivotally supported as at 83 a counterweight 84 which has a value sufficient to overcome the weight of the door 81 and move it into closed position after the contents of the bucket have been discharged and also sufficient to overcome the effort of the actuating weight 63 previously described. Pivotally coupled as at 85 to opposite side edges of the door 81 between the pivot 80 and the free end of the door are links 86 which project upwardly along opposite sides of the bucket 78, and formed near the upper ends of the links 86 are downwardly opening notches 87 the purpose of which will be more fully hereinafter explained. Mounted in suitable brackets 88 (Figure 4) near the upper end of the side of the bucket 78 remote from side to which the bottom 81 is pivoted is a shaft 89. This shaft 89 is of a length slightly greater than the width of the bucket 78, and fixed to opposite ends of the shaft are relatively short lever arms 90, the ends of which remote from the shaft 89 are pivotally connected as at 91 to the links 86 near the notches 87. These lever arms 90 are of such length that when the shaft 89 is in one position, the walls of the notches 87 will embrace the shaft 89 and latch the door 81 in closed position. Owing to the fact that the notches 87 partially embrace the shaft 89 the door 81 will be held against opening when a load is deposited in the bucket. A lever arm 92 is fixed to the shaft 89 and projects tangentially therefrom in the path of movement of the trip arm 64 so that when the trip arm moves upwardly under the influence of the downward movement of the counterweight 63, the lever arm 92 will be engaged to rotate the shaft 89 and swing the lever arms 90 about the axis thereof to disengage the walls of the notches 87 from the shaft and permit the door 81 to swing open under the influence of the contents of the bucket 78.

Figure 8:
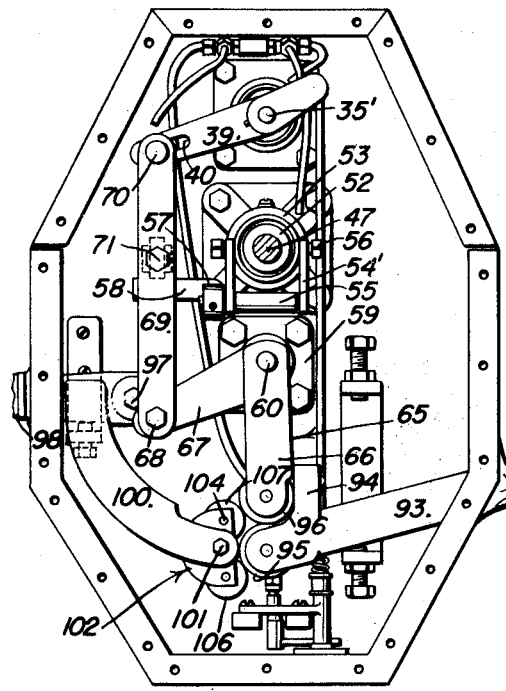
Figure 8 is a view similar to Figure 6 showing the position of the parts when the bucket is lowered and the bottom thereof open to discharge the contents thereof.
Figure 6:
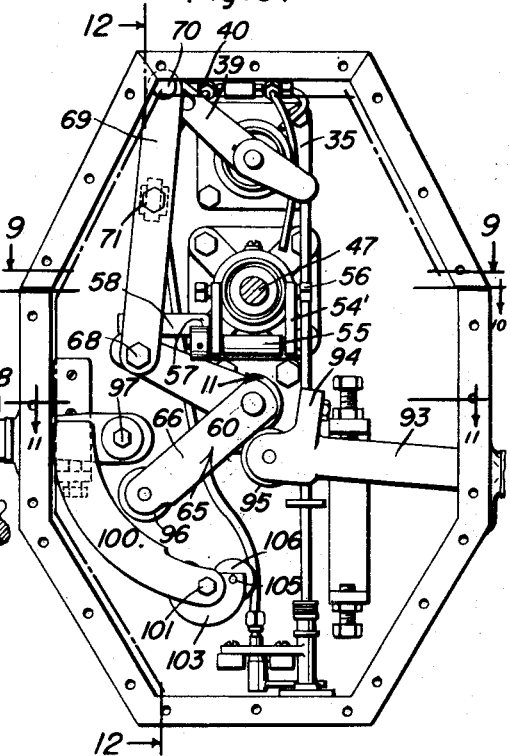
Figure 6 is an enlarged sectional view taken substantially on the line 6—6 of Figure 5 showing the position of the parts when the bucket is elevated.
Figure 7:
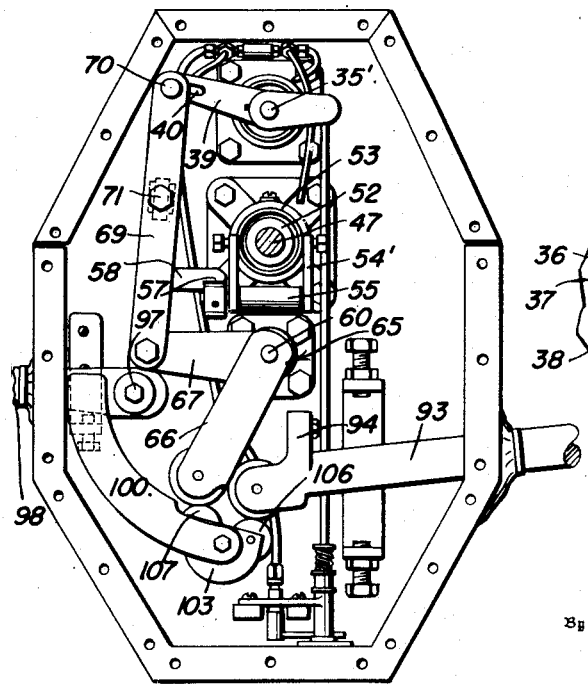
Figure 7 is a view similar to Figure 6 showing the parts in another position.

Fixed on the outside of the cap 27 to the rock shaft 72 and projecting toward the ends of the lever arms 73 upon which the bucket 78 is supported is an actuating arm 93. This arm is movable through an arc which aligns with and intersects the arc through which the check arm 66 of the bell crank 65 moves and formed adjacent the end of the arm 93 which intersects the arc of movement of the arm 66 is a stop 94. The end of the arm 93 adjacent the stop 94 carries a contact roller 95 which rides against one edge of the check arm 66 as will be readily understood upon reference to Figures 5 through 7 inclusive and at the end of the check arm 66 remote from the rock shaft 60 is carried a contact roller 96. By reason of the fact that the rock shaft 60 tends to rotate in a counter-clockwise direction under the influence of the actuating weight 63 it will be evident that the arm 66 will continuously ride against the roller 95, and since the arm 93 moves downwardly in unison with the downward movement of the bucket 78, as the latter is loaded, it will be evident that the arm 66 will also move downwardly in contact with the roller 95. Pivotally supported at 97 on the side of the rock shaft 60, remote from the arm 93, and movable about an axis parallel with said rock shaft 60 is a balance arm 98 which projects in a direction opposite the arm 93 and on which is adjustably supported a balance weight 99 by means of which the final closing of the gate 36 is effected, and the final opening of the door 81 is achieved. Carried by the balance arm 98 and movable in unison therewith in an arc which aligns with the arc through which the check arm 66 rocks, is an arcuate arm 100, the lower end of which has rockably supported therein as at 101 a breaker designated generally 102. This breaker comprises a substantially semi-circular body or carriage 103 which is rockably supported on the pivot 101 in the arm 100, and mounted in the carriage 103, for rotation about spaced parallel pins 104 and 105 which lie parallel to the pivot 101, are trip rollers 106 and 107 respectively. In the normal position of the breaker 102, the roller 106 lies in the path of movement of the roller 95 so that as the arm 93 approaches its lowermost position, the roller 95 will engage the roller 106 of the breaker 102, and the roller 96 of the arm 66 will engage the roller 107. At this point further downward movement of the arm 93 will be arrested until the weight of the contents of the bucket is sufficient to overcome the effort of the balance weight 99 on the balance arm 98 and thus permit a slight downward rocking movement of the breaker 102 about the axis of the pivot 97. Such retraction of the breaker 102 from its position directly beneath the roller 95 will permit the end of the arm 93 carrying a roller 95 to move further downwardly and below the lower end of the arm 66 so that the roller 96 will be moved over the roller 107 toward the stop 94 until the axis of the check arm 66 moves to the opposite side of the axis of the pivot 101. As this movement takes place, the weight within the bucket will cause the arm 93 suddenly to drop below the axis of the pivot 101 and into the position illustrated in Figure 7 so that the trip arm 64 is quickly moved against the lever arm 92 to rock the shaft 89 and release the door 81. When the arm 66 rests against the stop 94 as illustrated in Figure 8, the weight 63 will have moved the trip arm 64 upwardly into the position illustrated in Figure 4 so as to move the lever 92 and rotate the shaft 89 in a direction to swing the arms 90 upwardly and release the engagement of the walls of the notches 87 with the shaft 89, thus to permit the door 81 to open and discharge the contents of the bucket 78. Simultaneously with the movement of the rock shaft 60 under the influence of the weight 63, pull will be exerted on the link 69 to cause the lever 39 to rotate the trunnion 35' and move the gate 36 into chute closing position. At the same time the descent of the lever 69 will cause the pin 71 to contact the finger 58 and disengage the clutch halves 52 and 53 so as to disengage the driving force from the agitator shafts 42 and 47. In this way further flow of the material into the bucket will be interrupted, and at the same time the material which has been deposited in the bucket will be discharged therefrom to be received in a hopper 108 from which it is directed through a collar 109 into a suitable receptacle. Upon the discharge of the contents of the hopper, the counterweight 84 will return the door 81 to closed position, thereby rocking the shaft 89 and moving the lever arm 92 into the position illustrated in Figure 3. Such movement of the trip lever 92 will throw the trip arm 64 into the position substantially as illustrated in Figure 3, thus throwing the check arm into a position substantially as illustrated in Figure 7 and rocking the carriage 103 to its initial position as illustrated in Figure 6. The bucket 78 will return to its elevated position under the influence of the counterweight 75 and simultaneously the roller 95 will move upwardly along the arm 66 causing the latter to return to its initial position shown in Figure 6. With the upward movement of the roller 95 along the check arm 66 of the bell crank lever 65, the shaft 60 will be rocked against the effort of the counterweight 63 so that the stud 71 on the link 69 will disengage the finger 58 and permit the clutch half 52 to re-engage the clutch half 53 so as to set the agitators 43 and 49 into motion. Upon completion of the upward movement of the roller 95, the gate 36 will be moved into wholly open position to permit the material entering the chute 32 to fill the bucket 78 and repeat the cycle.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. In weighing apparatus of the type comprising a bucket mounted to move downwardly as material is deposited therein, said bucket having a top filling opening and a bottom discharge opening, means above the bucket for directing material into the bucket through the filling opening, a door carried by the bucket for closing the bottom discharge opening, and latch means carried by the bucket for releasably holding the door closed, means for releasing said latch means and permitting the door to open and discharge the contents of the bucket when the weight of said contents attains a predetermined value, said means comprising an actuating arm mounted adjacent and connected to the bucket for movement therewith, a rock shaft mounted above said actuating arm to rock about a horizontal axis, a trip arm carried by the rock shaft and movable therewith, means carried by the rock shaft to rock said shaft and move the trip arm into releasing engagement with the latch means, and a check arm mounted on the rock shaft for movement therewith in an arcuate path which lies in the path of movement of the actuating arm to prevent movement of the trip arm into releasing engagement with the latch means until the actuating arm passes below the arcuate path.

2. In weighing apparatus of the type comprising a bucket mounted to move downwardly as material is deposited therein, said bucket having a top filling opening and a bottom discharge opening, means above the bucket for directing material into the bucket through the filling opening, a door carried by the bucket for closing the bottom discharge opening and latch means carried by the bucket for releasably holding the door closed, means for releasing said latch means and permitting the door to open and discharge the contents of the bucket when the weight of said contents attains a predetermined value, said means comprising an actuating arm mounted adjacent and connected to the bucket for movement therewith, a rock shaft mounted above said actuating arm to rock about a horizontal axis, a trip arm carried by the rock shaft and movable therewith, means carried by the rock shaft to rock said shaft and move the trip arm into releasing engagement with the latch means, a check arm mounted on the rock shaft for movement therewith in an arcuate path which lies in the path of movement of the actuating arm to prevent movement of the trip arm into releasing engagement with the latch means until the actuating arm passes below the arcuate path, and means below the check arm and in the path of movement of the actuating arm to restrain movement of the actuating arm below the arcuate path until the weight of the contents of the bucket has attained a predetermined value.

3. In weighing apparatus of the type comprising a bucket mounted to move downwardly as material is deposited therein, said bucket having a top filling opening and a bottom discharge opening, means above the bucket for directing material into the bucket through the filling opening, a door carried by the bucket for closing the bottom discharge opening, and latch means carried by the bucket for releasably holding the door closed, means for releasing said latch means and permitting the door to open and discharge the contents of the bucket when the weight of said contents attains a predetermined value, said means comprising an actuating arm mounted adjacent and connected to the bucket for movement therewith, a rock shaft mounted above said actuating arm to rock about a horizontal axis, a trip arm carried by the rock shaft and movable therewith, means carried by the rock shaft to rock said shaft and move the trip arm into releasing engagement with the latch means, a check arm mounted on the rock shaft for movement therewith in an arcuate path which lies in the path of movement of the actuating arm to prevent movement of the trip arm into releasing engagement with the latch means until the actuating arm passes below the arcuate path, and a stop on the actuating arm in the arcuate path of the check arm to arrest movement thereof when the actuating arm passes below the arcuate path.

4. In weighing apparatus of the type comprising a bucket mounted to move downwardly as material is deposited therein, said bucket having a top filling opening and a bottom discharge opening, means above the bucket for directing material into the bucket through the filling opening, a door carried by the bucket for closing the bottom discharge opening, and latch means carried by the bucket for releasably holding the door closed, means for releasing said latch means and permitting the door to open and discharge the contents of the bucket when the weight of said contents attains a predetermined value, said means comprising an actuating arm mounted adjacent and connected to the bucket for movement therewith, a rock shaft mounted above said actuating arm to rock about a horizontal axis, a trip arm carried by the rock shaft and movable therewith, means carried by the rock shaft to rock said shaft and move the trip arm into releasing engagement with the latch means, a check arm mounted on the rock shaft for movement therewith in an arcuate path which lies in the path of movement of the actuating arm to prevent movement of the trip arm into releasing engagement with the latch means until the actuating arm passes below the arcuate path, means below the check arm and in the path of movement of the actuating arm to restrain movement of the actuating arm below the arcuate path until the weight of the contents of the bucket has attained a predetermined value, and a stop on the actuating arm in the arcuate path of the check arm to arrest movement thereof when the actuating arm passes below the arcuate path.

5. In weighing apparatus of the type comprising a bucket mounted to move downwardly as material is deposited therein, said bucket having a top filling opening and a bottom discharge opening, means above the bucket for directing material into the bucket through the filling opening, a door carried by the bucket for closing the bottom discharge opening, and latch means carried by the bucket for releasably holding the door closed, means for releasing said latch means and permitting the door to open and discharge the contents of the bucket when the weight of said contents attains a predetermined value, said means comprising an actuating arm mounted adjacent and connected to the bucket for movement therewith, a rock shaft mounted above said actuating arm to rock about a horizontal axis, a trip arm carried by the rock shaft and movable therewith, means carried by the rock shaft to rock said shaft and move the trip arm into releasing engagement with the latch means, a check arm mounted on the rock shaft for movement therewith in an arcuate path which lies in the path of movement of the actuating arm to prevent movement of the trip arm into releasing engagement with the latch means until the actuating arm passes below the arcuate path, a balance arm mounted intermediate its ends to move in a vertical arc, one end of said balance arm being disposed below the check arm, a balance weight adjustably mounted on the balance arm near the opposite end thereof, and means carried by the balance arm adjacent the end thereof below the check arm to arrest downward movement of the actuating arm until the weight of the contents of the bucket attains a predetermined value.

6. In weighing apparatus of the type comprising a bucket mounted to move downwardly as material is deposited therein, said bucket having a top filling opening and a bottom discharge opening, means above the bucket for directing material into the bucket through the filling opening, a door carried by the bucket for closing the bottom discharge opening, and latch means carried by the bucket for releasably holding the door closed, means for releasing said latch means and permitting the door to open and discharge the contents of the bucket when the weight of said contents attains a predetermined value, said means comprising an actuating arm mounted adjacent and connected to the bucket for movement therewith, a rock shaft mounted above said actuating arm to rock about a horizontal axis, a trip arm carried by the rock shaft and movable therewith, means carried by the rock shaft to rock said shaft and move the trip arm into releasing engagement with the latch means, a check arm mounted on the rock shaft for movement therewith in an arcuate path which lies in the path of movement of the actuating arm to prevent movement of the trip arm into releasing engagement with the latch means until the actuating arm passes below the arcuate path, a balance arm mounted intermediate its ends to move in a vertical arc, one end of said balance arm being disposed below the check arm, a balance weight adjustably mounted on the balance arm near the opposite end thereof, and a breaker pivotally supported on the balance arm adjacent the end thereof below the check arm, said breaker lying in the path of movement of the actuating arm to arrest downward movement thereof until the weight of the contents of the bucket attains a value sufficient to overcome the effort of the balance weight and cause the balance arm to move in its vertical arc.

7. In weighing apparatus of the type comprising a bucket mounted to move downwardly as material is deposited therein, said bucket having a top filling opening and a bottom discharge opening, means above the bucket for directing material into the bucket through the filling opening, a door carried by the bucket for closing the bottom discharge opening, latch means carried by the bucket for releasably holding the door closed, an actuating arm mounted adjacent and connected to the bucket for movement therewith, a rock shaft mounted above said actuating arm to rock about a horizontal axis, a trip arm carried by the rock shaft and movable therewith, means carried by the rock shaft to rock said shaft and move the trip arm into releasing engagement with the latch means, and a check arm mounted on the rock shaft for movement therewith in an arcuate path which lies in the path of movement of the actuating arm to prevent movement of the trip arm into releasing engagement with the latch means until the actuating arm passes below the arcuate path, means for interrupting the introduction of material into the bucket during the period that the discharge door thereof is open, said means comprising a gate pivotally supported above said bucket and movable into and out of the path of movement of material entering the bucket, a gate control arm connected to the gate for moving said gate into and out of the aforesaid path, an arm carried by the rock shaft and movable therewith and a link connected to the last mentioned arm and the gate control arm to cause the gate to move into and out of the path of movement of material entering the bucket as the check arm moves.

ELMER S. SCOTT.

REFERENCES CITED

The following references are of record in the file of this patent:

UNITED STATES PATENTS

| Number | Name | Date |
|--------|------|------|
| 589,291 | Richards | Aug. 31, 1897 |
| 589,297 | Richards | Aug. 31, 1897 |
| 589,302 | Richards | Aug. 31, 1897 |
| 600,022 | Richards | Mar. 1, 1898 |
| 2,097,522 | Hanique | Nov. 2, 1937 |